March 6, 1951 G. F. RACKETT 2,544,258
METHOD AND MEANS FOR FORMING FILM
Filed March 3, 1945
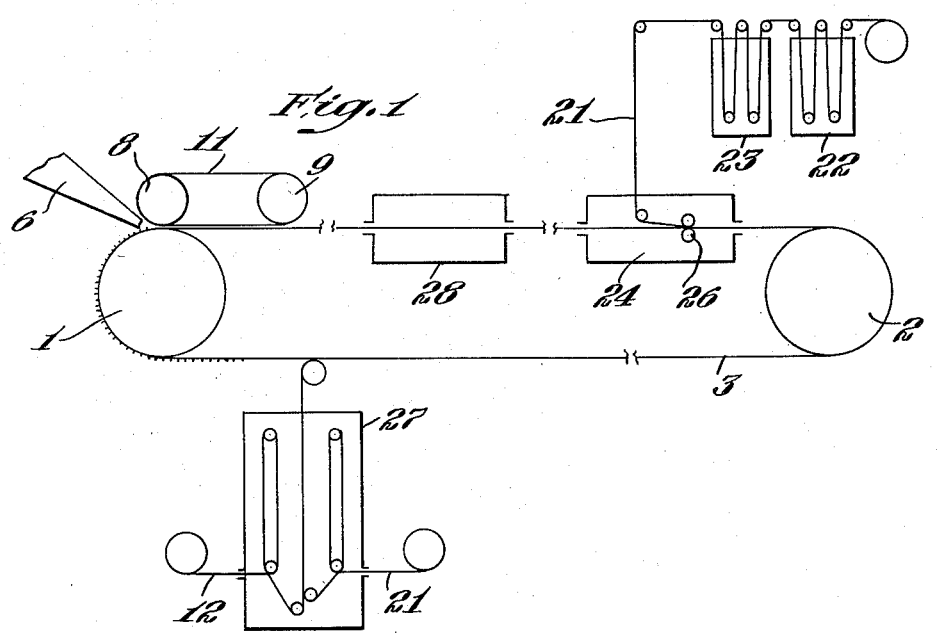
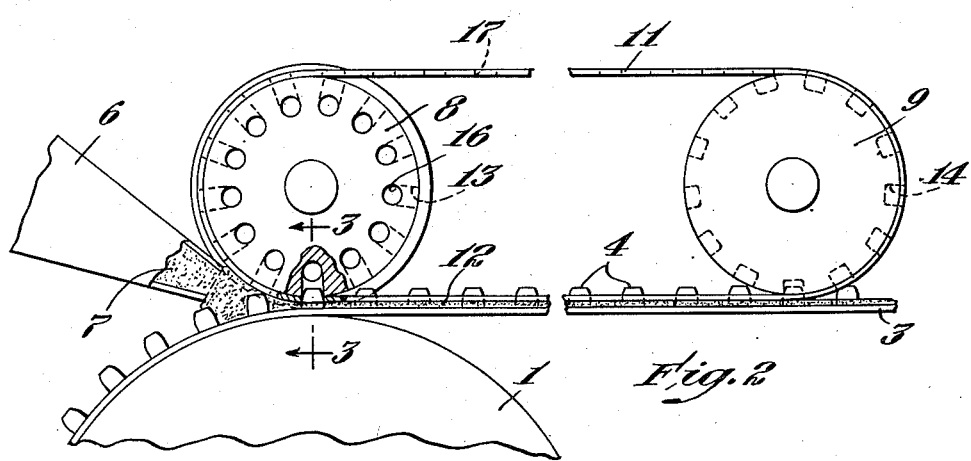
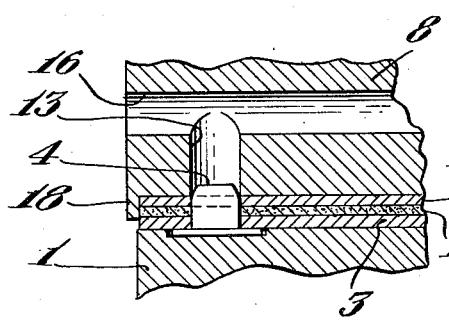
Inventor
Gerald F. Rackett
by Roberts, Cushman & Groves
Attys Patented Mar. 6, 1951

2,544,258

UNITED STATES PATENT OFFICE 2,544,258

METHOD AND MEANS FOR FORMING FILM

Gerald F. Rackett, Los Angeles, Calif., assignor to Technicolor Motion Picture Corporation, Hollywood, Calif., a corporation of Maine Application March 3, 1945, Serial No. 580,909

15 Claims. (Cl. 101—149.1)

In printing cinematographic pictures by imbibition it is customary to use ordinary film coated with gelatin which imbibes the dye from a printing matrix when the two are pressed together face to face. Such film must be manufactured in advance by first forming a base of cellulose acetate or the like and then coating the base with gelatin or the like. This not only involves considerable expense of manufacture but also the expense of shipping the film from film manufacturer to the printing establishment. Moreover the film must be carefully stored in humidified compartments and even when so stored its imbibition characteristics change with time.

Objects of the present invention are to provide a method and apparatus which eliminates the necessity of forming the film in advance of printing, which eliminates the necessity of coating the film base, which reduces the time and cost of imbibition printing and which affords a superior print.

In one aspect the present invention involves a method which comprises continuously feeding a carrier having a series of register teeth along a predetermined path, molding a film of plastic material on the carrier around the teeth at one location along the path and, at another location farther along the path, peeling the film away from the carrier. While the film is still on the carrier pictures may be printed on the film by imbibition or otherwise.

In another aspect the invention involves apparatus comprising a carrier having a succession of register teeth for engagement in the sprocket holes of film, together with means for molding a film of plastic material on the carrier around the teeth and means for peeling the molded film away from the carrier. Preferably the apparatus also comprises means for stripping the plastic material from the projecting ends of the teeth. The molding means preferably includes a roller for spreading the material on the carrier, the roller having peripheral openings to receive the projecting ends of the teeth. In the preferred embodiment the molding means comprises a pair of rollers spaced along the aforesaid path and an endless belt trained over the rollers, both the rollers and the belt having openings to receive the projecting ends of the teeth. The carrier preferably comprises an endless belt of thin flexible Monel metal or the like trained over a pair of spaced drums, the belt having rows of teeth mounted along its margins.

While any suitable molding material may be employed, for most purposes the finished film should be transparent. Typical examples comprise polyvinyl alcohol, polyvinyl acetal and regenerated cellulose. However, because of greater strength better results are obtained with cellulose esters such as cellulose acetate, cellulose acetopropionate and cellulose acetobutyrate. To improve its dye absorptivity the cellulose ester film may be treated with alkali such as sodium hydroxide or an organic amine such as ethanolamine or isopropylamine. For example, the film may be bathed for two minutes at 120° F. in a solution comprising three parts of 5% sodium hydroxide and two parts of isopropylamine, and then rinsed.

For the purpose of illustration a typical embodiment of the invention is shown in the accompanying drawings in which Fig. 1 is a diagrammatic view;

Fig. 2 is a side elevation of the molding means; and

Fig. 3 is a section on line 3—3 of Fig. 2.

The particular embodiment of the invention chosen for the purpose of illustration comprises two drums 1 and 2 and an endless register belt 3 trained over the two drums, the register belt carrying the register teeth 4 along its margins. One or both of the drums 1 and 2 are driven continuously by suitable means. The material for molding the film may be fed to the register belt from a hopper 6, the material being indicated at 7 in Fig. 2.

The means for molding the material on the register belt in the form of a thin film comprises two rollers 8 and 9 and an endless belt 11 trained over the two rollers, the space below the lower stretch of the belt 11 and the upper stretch of the belt 3 being equal to the desired thickness of the film 12 to be molded. The rollers 8 and 9 have radial openings 13 and 14 to receive the projecting ends of the teeth 4, and the roller 8 has transverse openings 16 communicating with the openings 13, the transverse openings 16 extending to the side faces of the roller. Thus if any of the molding material is forced into the radial openings 13 it can escape through the transverse openings 16 instead of being compacted in the radial openings. The belt 11 is provided with openings 17 to accommodate the teeth 4. As shown in Fig. 2 the teeth 4 of belt 3 are first completely covered with the plastic material and then, as the projecting ends of the teeth enter the openings 17 in belt 11, the plastic material is stripped from the projecting ends. While the molding material may be allowed to squeeze out at the sides of the belts 3 and 11, the edges then being trimmed after the film is molded, suitable means are preferably provided for confining the molding material at the edges of the belts 3 and 11. Thus in Fig. 3 the roller 9 is provided with flanges 18 to prevent the material from squeezing out at the sides. After the film is shaped it is carried by the carrier until the plastic material has set.

Pictures may be printed on the film while it is still on the carrier 3 by the imbibition means indicated diagrammatically in Fig. 1. This apparatus comprises a matrix film 21 having dye-absorptive images thereon, a tank 22 in which the dye-absorptive images may be saturated with dye, a tank 23 in which the superficial dye is washed off, a liquid tank 24 in which the matrix 21 is pressed against the molded film 12 by pressure rollers 26 and a drying compartment 27 in which the two films are dried and then separately reeled. By bringing the two films together while submerged in the liquid in tank 24, air bubbles are excluded from between the films and a better transfer results. If the molded film 12 is pretreated, another liquid tank 28 may be provided. The endless belt 3 and the films carried thereon enter and leave the tanks 24 and 28 through narrow slots which are provided with liquid traps to minimize the loss of liquid.

From the foregoing it will be evident that the film may be printed as manufactured and that after the film is formed it need not be perforated with a perforating machine because the register openings are formed in molding the film.

It should be understood that the present disclosure is for the purpose of illustration only and that this invention includes all modifications and equivalents which fall within the scope of the appended claims.

I claim:

1. In the art of cinematography the method which comprises continuously feeding a carrier having a series of register teeth along a predetermined path, at one location along the path molding a mass of plastic material on the carrier around the teeth to form a film with the teeth projecting through the film, and at another location farther along the path peeling the film away from the carrier.

2. In the art of cinematography the method which comprises continuously feeding a carrier having a series of register teeth along a predetermined path, at one location along the path molding a mass of plastic material on the carrier around the teeth to form a film with the teeth projecting through the film, stripping the plastic material from the projecting ends of the teeth carrying the material on the carrier until the plastic material has set, and at another location farther along the path peeling the film away from the carrier.

3. In the art of cinematography apparatus comprising a carrier having a succession of register teeth for engagement in the sprocket holes of film, means for molding a film of plastic material on the carrier around said teeth, said means including a roller for spreading the material on the carrier, the roller having peripheral openings to receive the ends of said teeth, and means for peeling the molded film away from the carrier.

4. In the art of cinematography apparatus comprising a carrier having a succession of register teeth for engagement in the sprocket holes of film, means for molding a film of plastic material on the carrier around said teeth, said means including a pair of rollers spaced along said path and an endless belt trained over the rollers, the rollers and belt having openings to receive the ends of said teeth, and means for peeling the molded film away from the carrier.

5. In the art of cinematography apparatus comprising a pair of spaced drums, an endless register belt trained over the drums to travel in an orbital path, the belt having a succession of register teeth for engagement in the sprocket holes of film, means at one location along said path for molding a film of plastic material on the register belt around said teeth, and means at another location farther along the path for peeling the molded film away from the belt.

6. In the art of cinematography apparatus comprising a pair of spaced drums, an endless register belt trained over the drums to travel in an orbital path, the belt having a succession of register teeth for engagement in the sprocket holes of film, means at one location along said path for molding a film of plastic material on the register belt around said teeth, means for stripping the plastic material from the projecting ends of the teeth, and means at another location farther along the path for peeling the molded film away from the belt.

7. In the art of cinematography apparatus comprising a pair of spaced drums, an endless register belt trained over the drums to travel in an orbital path, the belt having a succession of register teeth shaped and spaced to fit in the sprocket holes of film, means at one location along said path for molding a film of plastic material on the register belt around said teeth, said means including a roller for spreading the material on the carrier, the roller having peripheral openings to receive the ends of said teeth, and means at another location farther along the path for peeling the molded film away from the belt.

8. In the art of cinematography apparatus comprising a pair of spaced drums, an endless register belt trained over the drums to travel in an orbital path, the belt having a succession of register teeth shaped and spaced to fit in the sprocket holes of film, means at one location along said path for molding a film of plastic material on the register belt around said teeth, said means including a pair of rollers spaced along said path and an endless belt trained over the rollers, the rollers and belt having openings to receive the ends of said teeth, and means at another location farther along the path for peeling the molded film away from the belt.

9. In the art of cinematography apparatus comprising a carrier traveling in an orbital path and having a succession of register teeth for engagement in the sprocket holes of film, means at one location along said path for molding a mass film of plastic material on the carrier around said teeth to form a dye-absorptive film with the teeth projecting through the film, means at another location farther along said path for printing pictures on the film by imbibition, and means at another location still farther along said path for peeling the film away from the carrier.

10. In the art of cinematography apparatus comprising a carrier traveling in an orbital path and having a succession of register teeth for engagement in the sprocket holes of film, means at one location along said path for molding a dye-absorptive film of plastic material on the carrier around said teeth with the ends of the teeth projecting beyond the film, means for stripping the plastic material from the sides of the projecting ends of the teeth, means at another location farther along said path for printing pictures on the film by imbibition, and means at another location still farther along said path for peeling the film away from the carrier.

11. In the art of cinematography apparatus comprising a carrier traveling in an orbital path and having a succession of register teeth for engagement in the sprocket holes of film, means at one location along said path for molding a dye-absorptive film of plastic material on the carrier around said teeth, said means including a roller for spreading the material on the carrier, the roller having peripheral openings to receive the ends of said teeth, means at another location farther along said path for printing pictures on the film by imbibition, and means at another location still farther along said path for peeling the film away from the carrier.

12. In the art of cinematography apparatus comprising a carrier traveling in an orbital path and having a succession of register teeth for engagement in the sprocket holes of film, means at one location along said path for molding a dye-absorptive film of plastic material on the carrier around said teeth, said means including a pair of rollers spaced along said path and an endless belt trained over the rollers, the rollers and belt having openings to receive the ends of said teeth, means at another location farther along said path for printing pictures on the film by imbibition, and means at another location still farther along said path for peeling the film away from the carrier.

13. In the art of cinematography apparatus comprising a pair of spaced drums, an endless register belt trained over the drums to travel in an orbital path, the belt having a succession of register teeth for engagement in the sprocket holes of film, means at one location along said path for molding a dry-absorptive film of plastic material on the register belt around said teeth, means at another location farther along said path for printing pictures on the film by imbibition, and means at another location still farther along said path for peeling the film away from the belt.

14. In the art of cinematography the method which comprises continuously feeding a carrier having a series of register teeth along an orbital path, at one location along the path molding a dye-absorptive film of plastic material on the carrier around the teeth, stripping the plastic material from the sides of the projecting ends of the teeth, at another location farther along the path printing pictures on the film by imbibition, and at another location still farther along the path peeling the film away from the carrier.

15. In the art of cinematography the method which comprises continuously feeding a carrier having a series of register teeth along an orbital path, at one location along the path molding a mass of plastic material on the carrier around the teeth to form a dye-absorptive film with the teeth projecting through the film, at another location farther along the path printing pictures on the film by imbibition, and at another location still farther along the path peeling the film away from the carrier.

GERALD F. RACKETT.

REFERENCES CITED

The following references are of record in the file of this patent:

UNITED STATES PATENTS

| Number | Name | Date |
| --- | --- | --- |
| 775,540 | McConnel | Nov. 22, 1902 |
| 1,116,762 | Thornton et al. | Nov. 10, 1914 |
| 1,308,111 | Porzel | July 1, 1919 |
| 1,469,815 | Lovejoy | Oct. 9, 1923 |
| 1,509,174 | Portkorny | Sept. 23, 1924 |
| 1,751,430 | Thomson | Nov. 18, 1930 |
| 1,905,663 | Wallace | Apr. 25, 1933 |
| 2,029,273 | Montgomery | Jan. 28, 1936 |
| 2,075,735 | Loomis | Mar. 30, 1937 |
| 2,097,593 | Kinsella | Nov. 2, 1937 |
| 2,183,520 | VanDerhoef | Dec. 19, 1939 |
| 2,288,611 | DeWyk | July 7, 1942 |
| 2,294,966 | Dreyfus | Sept. 18, 1942 |
| 2,303,395 | Schultz | Dec. 1, 1942 |
| 2,328,492 | Rackett | Aug. 31, 1943 |
| 2,348,944 | White | May 16, 1944 |

FOREIGN PATENTS

| Number | Country | Date |
| --- | --- | --- |
| 419,900 | Great Britain | Nov. 21, 1934 |